Nov. 7, 1933.  E. THOMPSON  1,934,283
SCRAPER FOR ICE CREAM FREEZERS
Filed Aug. 18, 1932
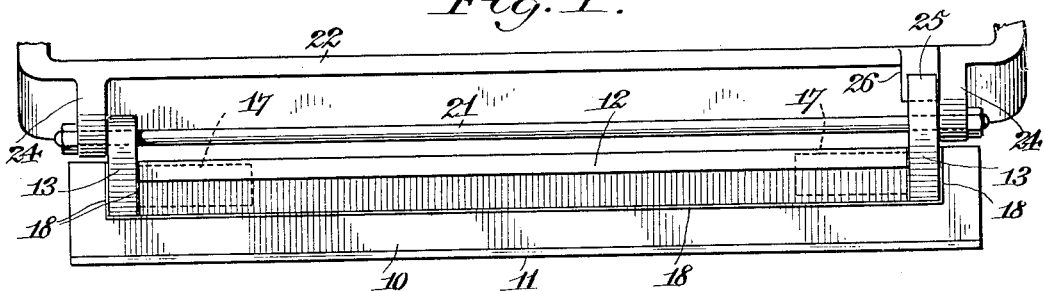
Fig. 1.
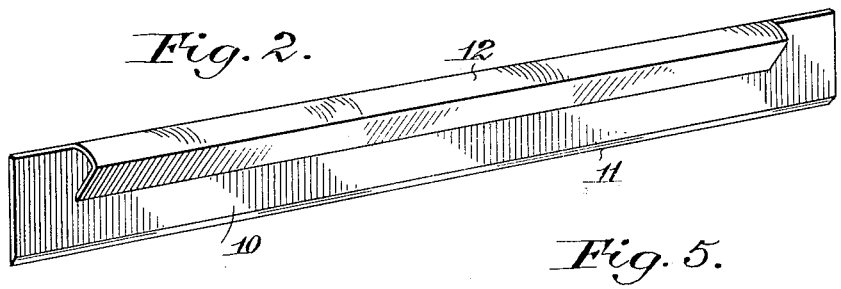
Fig. 2.
Fig. 3.   Fig. 4.   Fig. 5.
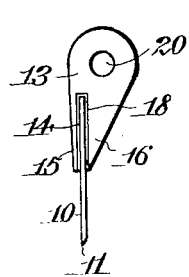 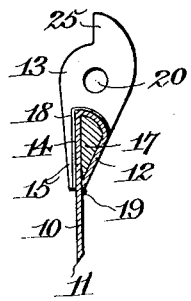 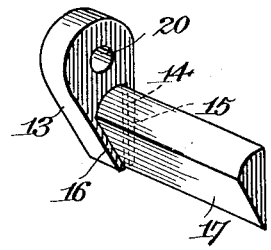
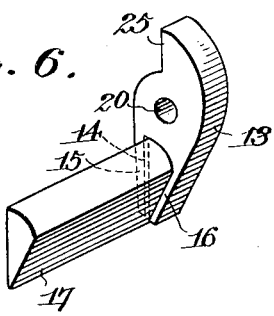
Fig. 6.
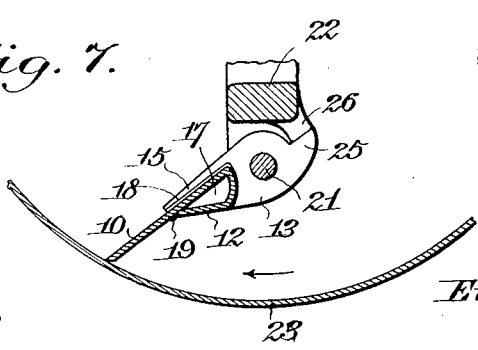
Fig. 7.
WITNESS
Chris Peinle.
INVENTOR
Emery Thompson.
BY Munn & Co.
ATTORNEYS Patented Nov. 7, 1933

1,934,283

UNITED STATES PATENT OFFICE 1,934,283

SCRAPER FOR ICE CREAM FREEZERS

Emery Thompson, New Rochelle, N. Y.

Application August 18, 1932. Serial No. 629,384

5 Claims. (Cl. 259—109)

This invention relates to a scraper which is designed and adapted for use inside of the freezing cylinder of an ice cream freezer, to scrape off or remove any portion of the mixture in the cylinder which might adhere to the inside wall surface thereof during the mixing or agitating of the mixture. The scraper aids the mixing or agitating means of the freezer in constantly agitating the mixture within the freezing cylinder, and prevents a layer of the mixture from adhering to the cylindrical wall, to the end that effectual refrigeration of the mixture may be attained and at the same time quickening the freezing time.

Some of the objects and advantages of the invention are: to attach the blades of the scraper in a manner so that they will be self-sharpening while in motion to maintain them in the same scraping or cutting pitch; and to enable the easy and economical removal and replacement of the blades whenever the occasion arises.

With the foregoing and other objects in view the invention resides in the particular provision, construction and functions of the parts hereinafter fully described and illustrated in the accompanying drawing, in which Figure 1 is a side view of a scraper constructed in accordance with the invention;

Figure 2 is a perspective view of the scraper blade;

Figure 3 is an end view showing the blade and one of the attaching lugs;

Figure 4 is a cross section of the blade and the other attaching lug;

Figure 5 is a perspective view of the attaching lug appearing in Figure 3;

Figure 6 is a perspective view of the attaching lug appearing in Figure 4; and

Figure 7 is a sectional view showing a portion of the freezing cylinder and the scraper in use.

In accordance with the invention use is made of a scraper blade 10. The blade is made of a single piece of relatively thin stock of uniform thickness, such as German silver, Monel metal or Allegheny metal. It will, therefore, be understood that the blade 10 will be flexible. The thickness of the material from which the blade is made will depend upon the size of the freezing cylinder. For a relatively small freezer the thickness of the blade may be one-thirty-second ($\frac{1}{32}''$) of an inch, and a very large cylinder will require a blade approximately one-eighth ($\frac{1}{8}''$) of an inch in thickness. The length of the blade 10 will depend upon the length of the freezing cylinder and will be long enough to extend approximately from one end of the cylinder to the other end. One longitudinal edge of the blade will be bevelled or sharpened to provide a cutting or scraping edge 11. The back of the blade 10 has a tubular section 12 which may be of any non-circular shape in cross section, and in the present instance is substantially triangular in shape.

The tubular back section 12 is formed from the material of the blade in the present instance, and is open at each end. The section 12 is of less length than the blade 10, the same terminating short of each end of the blade. Use is made of attaching lugs 13 and each lug is bifurcated by reason of a kerf 14, the furcations 15 and 16 being tapered toward the entrance end of the kerf 14. These furcations 15 and 16 constitute clamping means which clamp the back portions of the blade 10 to secure the latter thereto. In the present instance use is made of two lugs 13, which are arranged respectively on the opposite ends of the blade 10 and projecting from the back edge thereof. In the present instance, each lug 13 has formed integral therewith or secured thereto a rigid member 17 which corresponds in cross sectional shape to that of the tubular back section 12 and extends into said section 12. These members 17 on the lugs 13 aid materially in attaching the lugs 13 to the blade 10. The member 17 on each lug 13 is slid or inserted into the related end of the tubular section 12, and at the same time the back portion of the end of the blade 10 is brought into the kerf 14 to be clampingly engaged by the furcations 15 and 16. From the foregoing it will be apparent that the blade 10 may be readily attached to the lugs 13, and that it may also be detached or removed from the lugs 13. The lugs 13 may be soldered at the joints between the lugs and the blade 10 as at 18. The edge of the tubular section 12 which contacts the face of the blade 10 may also be soldered to the blade, as at 19, to seal the joint at this point. When it is desired to replace the blade 10 for any reason the solder 18 may be removed. A new blade may then be substituted for the one removed in the manner explained hereinabove. It will, therefore, be understood that it will not be necessary to discard the lugs 13.

In accordance with another feature of the invention, the ends of the lugs 13 are projected beyond the back edge of the blade 10 and have provision in the form of holes 20 to accommodate suitable means 21 for the purpose of mounting the blade 10 for pivotal movement in relation to one of the side members 22 of a frame forming a part of the mixing or agitating means which operates within the freezing cylinder. It is to be understood that the side member 22 will be disposed substantially parallel to the cylindrical wall of the freezing cylinder, a portion of which is shown in Figure 7 and designated 23. The side member 22 has spaced lugs 24 having holes therein which are in axial alignment and which register with the holes 20 in the lugs 13. The means 21 hereinbefore referred to consist of a tie rod or shaft which extends through the holes in the lugs 13 and 24, and nuts are applied to the ends of the rod, as shown most clearly in Figure 1. The scraper may comprise any number of blades 10, two being sufficient for adequately removing or scraping the portions of the mixture adhering to the cylindrical wall of the cylinder 23. Each blade 10 moves in the direction indicated by the arrow in Figure 7.

One or both of the lugs 13 may be provided with means limiting the movement of the blade 10 in a reverse direction. In the present instance only one of the lugs is provided with such means, which consists of a projection 25 integral with the lug. This projection 25 is engageable with a projection 26 on the side member 22.

From the foregoing it will be apparent that the blade 10 will be self-sharpening; that it may readily adjust itself to the curvature of the cylinder wall and remain set at the desired angle or at the proper pitch; and that the blade may be readily removed and replaced whenever the occasion arises without discarding or scrapping other parts of the mixing and agitating means.

I claim:

1. A scraper of the class described, including a metal blade having a tubular back section non-circular in cross section, and attaching lugs, each of said lugs having a rigid member which corresponds in cross-sectional shape to that of said back section and extending thereinto to secure the lug to the blade, and said lugs being arranged in spaced relation and projecting beyond the back edge of the blade.

2. A scraper of the class described, including a metal blade having a tubular back section non-circular in cross section, said tubular back section being formed from the material of the blade, and attaching lugs, each lug having a rigid member which corresponds in cross-sectional shape to that of said back section and extending thereinto to secure the lug to the blade, and said lugs being arranged in spaced relation and projecting beyond the back edge of the blade.

3. A scraper of the class described including a blade made of a piece of relatively thin flexible metal of uniform thickness and having an open end back portion, and attaching lugs, said lugs being arranged in spaced relation and extending from the back of the blade and having a securing portion fitting in said back portion.

4. A scraper of the class described including a blade having a hollow portion, and attaching lugs, each of said lugs having a rigid portion fitting in said hollow portion and also having means which clamps the blade to secure the latter to the lugs, said lugs being arranged in spaced relation and extending from the blade.

5. A scraper of the class described including a blade having a hollow portion extending longitudinally thereof, and attaching lugs, each of said lugs having a laterally extending rigid portion fitting in said hollow portion and also having means which clamps the blade to secure the latter to the lugs, said lugs being arranged in spaced relation and extending from the blade.

EMERY THOMPSON.